May 24, 1932. G. S. SMITH 1,859,575
CABLE SUPPORT FOR HIGHWAY BARRIERS
Filed April 4, 1931
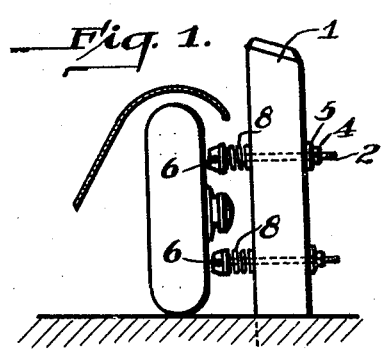
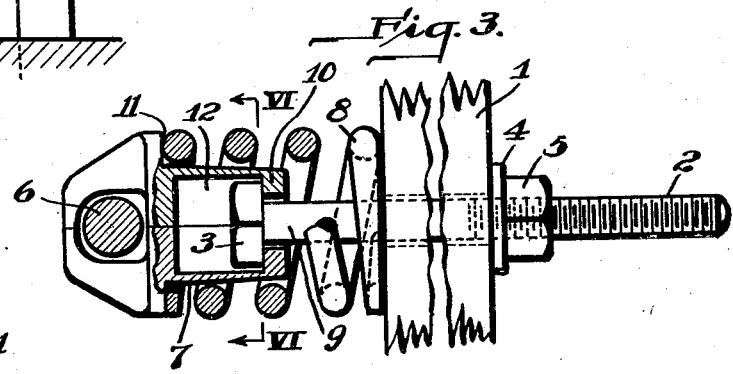
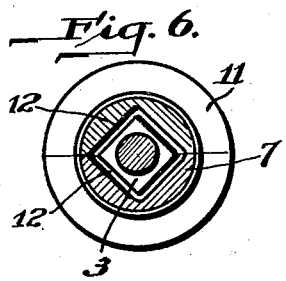
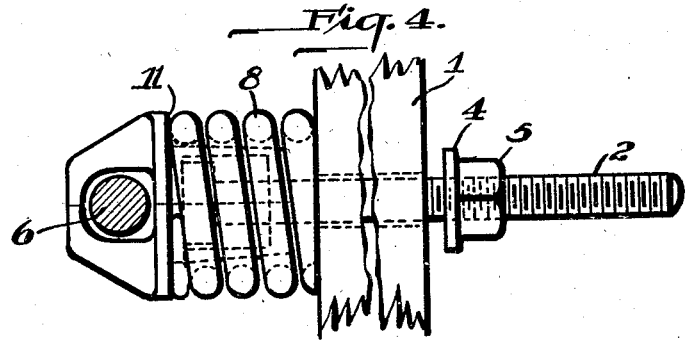
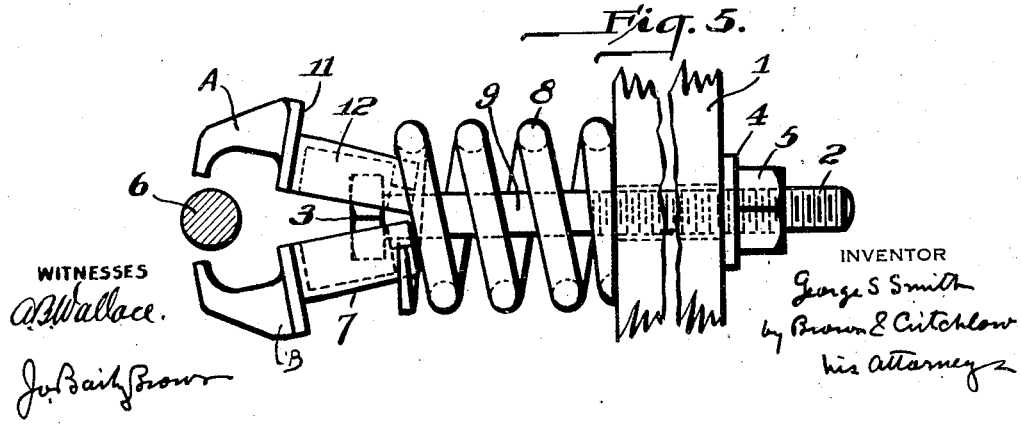

Patented May 24, 1932

1,859,575

UNITED STATES PATENT OFFICE

GEORGE S. SMITH, OF PITTSBURGH, PENNSYLVANIA, ASSIGNOR TO PITTSBURGH SCREW & BOLT CORPORATION, OF PITTSBURGH, PENNSYLVANIA, A CORPORATION OF PENNSYLVANIA

CABLE SUPPORT FOR HIGHWAY BARRIERS

Application filed April 4, 1931. Serial No. 527,625.

This invention relates to highway barriers and particularly to a resilient barrier-cable support of the type in which a cable is spaced away from a carrying post, and impact on the cable is cushioned by a spring interposed between the cable and the post.

Barrier-cable supports of this type have usually been affixed to barrier posts by J-bolts. Such bolts are of special construction and are easily bent by blows from fast-moving automobiles or heavy trucks striking the cables.

An object of this invention is to provide a cable support that utilizes a standard bolt relatively shorter than heretofore used. Another object is to hold the cable positively, so that it cannot escape from its support, and so as to direct stresses axially against the supporting bolt, and the surrounding spring. A further object is to provide a cable-engaging terminal that is tapered or rounded off on all its external contours so as to fend off an impacting vehicle with a minimum of damage to the contacting parts thereof.

Other objects and advantages will be apparent with an understanding of the invention described in this application.

In the accompanying drawings Fig. 1 is a side elevation of a barrier post and two cable supports embodying the invention claimed herein, showing the barriers in spaced relation to an impinging vehicle wheel; Fig. 2 is a plan view of a portion of the barrier showing two adjacent posts with a cable support therebetween; Fig. 3 is an enlarged side view of a portion of a post and one of these resilient cable-holding units in normal position; Fig. 4 is a side elevation similar to Fig. 3 but with the spring and the bolt pushed back from normal position as by an impact on the cable; Fig. 5 is a side elevation similar to Fig. 3 showing the cable clamp partly assembled about a cable and a bolt head respectively; and Fig. 6 is a vertical section along the line VI—VI through the clamp and bolt shank as shown in Fig. 3.

Referring to Figs. 3, 4 and 5, there are shown a barrier post 1, and a cable supporting member comprising a straight bolt 2 extending through a bore in the barrier post and having a standard square head 3. The rear of the bolt is threaded and provided with a washer 4 and nut 5.

Secured to the head of the bolt is a split detachable clamp for holding a barrier cable 6. This comprises a rearwardly extending housing 7, which is tapered exteriorly to fit into a helical spring 8 disposed about the shank 9 and head 3 of the bolt. The clamp has a shoulder 11 which seats on the flat outer end of spring 8. The housing is adapted to receive head 3 of the bolt, in a longitudinal chamber 12, the head being retained in the housing by a rear wall 10 adapted to fit about shank 9 of the bolt and to engage the back of the bolt head. The chamber in housing 7 is of such length as to permit a substantial longitudinal movement of the bolt head 3 therein, and it is slightly larger than the bolt head, so that some lateral movement of the clamp is permitted.

The housing is smaller at its inner end than just adjacent the shoulder 11. The inner end readily enters the outer coil of the spring, thus facilitating assembly. The outer coil of the spring is bent into plane normal to the axis of the spring so as to furnish a flat seat for shoulder 11. Into this outer coil the tapered housing adjacent the shoulder fits snugly, thereby locking the two parts of the clamp tightly together. The smaller end of the tapered housing being free permits the clamp as a whole to rock with respect to its seat on the spring. This play of the clamp in the spring is also permitted by loose fit of the bolt and its head in the housing. The result is that relative movement of the clamp and bolt may result from either inward or lateral pressure on the clamp end. This tends to prevent bending of the bolt under impact on the cable, and generally renders the structure more flexible and resilient under the strains to which barrier cable supports are exposed.

The chamber is preferably of non-circular cross-sectional shape so as to prevent the bolt head from turning therein. As shown, the chamber is square to conform to a square-headed bolt. But obviously a bolt head and chamber of any non-circular shape, or a round-headed bolt with a flattened shank and correspondingly shaped opening in the wall 10 will secure the same results.

The clamp is formed of two similar halves A and B, formed as though it were split longitudinally as shown in Fig. 5. By this construction the clamp halves may be fitted over the bolt head and thrust into the outer end of the helical spring along the bolt shank as shown in Fig. 5. The cable is laid in the open jaw and nut 5 is turned up to compress spring 8 to draw the clamp into locking engagement with the bolt head and cable, as shown in Fig. 3.

Cable 4 is loosely held by the clamp, having such play therethrough that sudden stresses may be transmitted to several posts by slippage of the cable.

The outer end or nose of the clamp is tapered on all sides to assist in causing an impacting vehicle to glance off, to prevent scratching of wheels, etc. as much as possible. All the sides taper outwardly to a smaller diameter so that a vehicle necessarily strikes a glancing blow, thus minimizing side thrust on the bolt as well as minimizing danger to the vehicle itself. The internal edges of the cable-contacting portion of the clamp are rounded to prevent biting of the barrier cable that would prevent slippage, as well as to prevent fraying of the cable. The rear of the clamp proper abuts the entire outer end of the helical spring interposed between itself and the barrier post so that stresses are distributed to both sides of the spring.

In operation the clamp is normally drawn in against the spring so that rear wall 10 of the housing is in contact with the back of the bolt head, this resulting from drawing the nut 5 tightly into engagement with the barrier post. When stress is applied to the barrier cable, as by the impact of a vehicle, spring 8 is compressed and the clamp is pushed back along the bolt until the head of the bolt engages the front of chamber 12. This play is sufficient to take up all normal impacts. However, under greater stress, spring 8 may be compressed farther by the abutting clamp. When this occurs, the bolt may be thrust back through the post. See Fig. 4.

By the construction shown, the cable is supported in line with the common axis of the spring and bolt. Most of the strains on the cable from vehicle impact will therefore be applied symmetrically with respect to the bolt and spring axes. This is of considerable importance since if forces are applied unsymmetrically with respect to the axis of the bolt or spring, the bolt would be bent by forces that will not injure it when applied directly to its end and in line with the common axis of the bolt and spring.

The extension of this housing into the spring coil also provides support axially of the spring to offset side thrusts and glancing blows. This reinforces the bolt and tends to prevent bending thereof.

An advantage of the arrangement here shown is the fact that but a relatively short bolt shank need extend through the post to engage the clamp and spring. Also a standard stock bolt may be used. This naturally reduces manufacturing expense.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:
1. In a highway-barrier cable support comprising a barrier post, a headed bolt extending through the post slidably supported therein and having a non-circular head, and a helical spring surrounding said bolt, the combination of a barrier-cable clamp comprising an annular cable clamp abutting the outer end of said spring and a hollow housing integral with said clamp and extending snugly into the spring, the housing enveloping the terminal portion of the bolt and having a non-circular bore conforming to the bolt head and of sufficient length to permit relative movement of the bolt head therein and having a rear wall to engage the back of the head to limit play between it and the housing.

2. In a resilient highway-barrier cable support comprising a barrier post, the combination of an angularly-headed bolt extending from the post and slidably supported thereby, a helical spring surrounding the bolt, and a detachable barrier-cable clamp comprising an annular cable support abutting the outer end of the spring and a housing integral with the support and extending snugly into the spring, the housing detachably enveloping the head of the bolt and having an angular bore conforming to the head and of sufficient length to permit axial play and having a rear wall to engage the back of the head to limit play between the bolt and housing.

3. In a highway barrier comprising cables and supporting posts, means for attaching the cables to the posts comprising a bolt extending through the post and having its head toward the highway, a coil spring positioned around the bolt and seated against the post, a split clamp for engaging the cable comprising two similar complementary jaw members having shoulders adapted to seat on the spring and rearward extensions beyond the shoulders forming an elongated housing adapted to seat inside and be held together by the spring and to engage the bolt head.

4. In a highway barrier comprising cables and supporting posts, means for attaching the cables to the posts comprising a bolt extending through the post and having its head toward the highway, a coil spring positioned around the bolt and seated against the post, a split clamp for engaging the cable comprising two similar complementary jaw members, each having an inward extension, the two extensions forming an elongated housing adapted to be gripped by the spring and to slidably inclose the bolt head.

5. In a highway barrier comprising cables and supporting posts, means for attaching the cables to the posts comprising a bolt extending through the post and having its head toward the highway, a coil spring positioned around the bolt and seated against the post, a split clamp for engaging the cable comprising two similar complementary jaw members, each having an inward extension, the two extensions forming an elongated housing adapted to seat inside and be held together by the spring, the inside of the housing forming a chamber for inclosing the bolt head and permitting movement of the bolt head therein, the spring normally pressing the housing to the outer limit of its travel relative to the bolt head.

6. In a highway barrier comprising cables and supporting posts, supports for attaching the cables to the posts comprising a bolt extending through the post and having its head toward the highway, a coil spring positioned around the bolt and seated against the post, a split clamp for engaging the cable comprising two similar complementary jaw members each having a tapered inward extension, the two extensions being adapted to form an elongated housing adapted to seat inside and be held together by the spring, a chamber in the housing adapted to slidably inclose the bolt head so as to permit relative longitudinal movement between the clamp and bolt, the spring being adapted to resist inward movement of the housing on the bolt head.

7. In a highway barrier comprising cables and supporting posts, supports for attaching the cables to the posts comprising a bolt extending through the post and having its head toward the highway, a coil spring positioned around the bolt and seated against the post, a split clamp for engaging the cable comprising two similar complementary jaw members each having a tapered extension, the two extensions being adapted to form an elongated housing adapted to seat inside and be held together by the spring, a chamber in the housing adapted to slidably engage the bolt head to permit relative longitudinal movement between the clamp and bolt, the spring being adapted to resist inward movement of the housing on the bolt head, the jaw members being rounded off on all outer edges so as to present minimum obstruction to objects contacting therewith.

8. In a highway barrier comprising cables, supporting posts, and means for attaching the cables to the posts comprising a bolt extending through the post and having its head toward the highway, the combination with the bolt of a coil spring positioned around the bolt and seated against the post, two similar complementary jaw members adapted to retain a cable between their outer or head portions, each jaw member having a rearward shank portion rounded and tapered and the two adapted to fit snugly in the spring and to be clamped together thereby, the inner faces of said shanks being channelled out to form a retaining track-way for a head on the bolt, the spring normally forcing the jaw members together and outward from the post to the limit of their travel on the bolt.

In testimony whereof, I sign my name.

GEORGE S. SMITH.